July 21, 1931.  F. L. GRANT  1,815,771

BALL AND SOCKET CONNECTION

Filed Dec. 31, 1928

Inventor
Frank L. Grant,
By Hull, Buck & West

Patented July 21, 1931

1,815,771

UNITED STATES PATENT OFFICE

FRANK L. GRANT, OF CLEVELAND, OHIO, ASSIGNOR TO THE GABRIEL COMPANY, OF CLEVELAND, OHIO, A CORPORATION OF OHIO

BALL AND SOCKET CONNECTION

Application filed December 31, 1928. Serial No. 329,384.

This invention relates to ball-and-socket connections, and more particularly to the means for preventing access of dust to such connections. While capable of more general application, the means shown herein is designed with special reference for use with ball-and-socket connections between the ends of the arms which connect shock absorbers of the hydraulic type with the axles of the vehicles on which the shock absorbers are used. The aforesaid connections are exposed to the dust arising from the roads on which the automobiles are traveling, and it is important that they should be provided with effective means for excluding such dust from the working parts thereof.

It is the general purpose and object of the invention to provide a dust cap for a joint of the character referred to, which is simple and economical of production, and which is capable of accomplishing the dust exclusion in a very efficient manner.

A further object of the invention is to provide a cooperating arrangement of dust cap and mounting therefor which will enable the cap to withstand the incidents of use over a protracted period of time and without deterioration.

Figure 1:
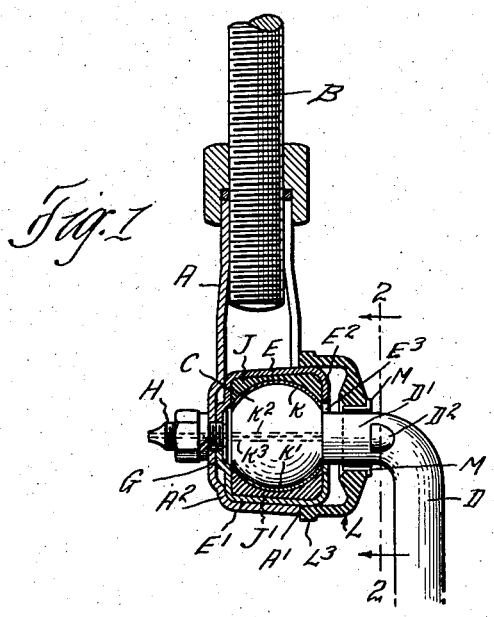
Figure 2:
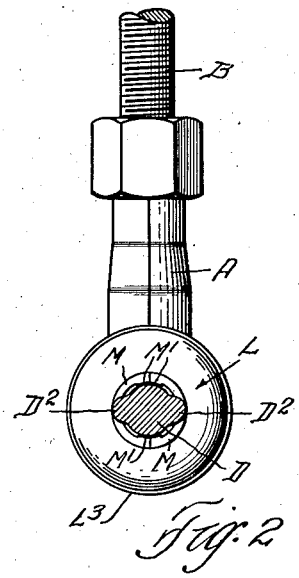
Figure 6:
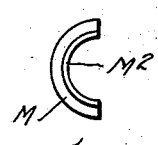
Figure 7:
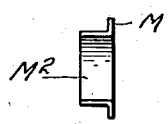
Figure 3:
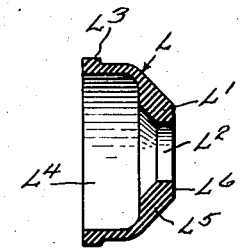
Figure 4:
Figure 5:
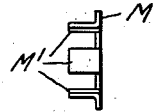

In the drawings forming part of this application, Fig. 1 represents a vertical sectional view through a ball-and-socket joint having my invention applied thereto and showing the ends of the arms connected by such joint; Fig. 2 a detail in section corresponding to the line 2—2 of Fig. 1; Fig. 3 a sectional view through the dust cap; Fig. 4 an end elevation of the sections of a bushing employed with my dust cap; Fig. 5 a side elevation of one of the sections of said bushing; and Figs. 6 and 7 are views corresponding respectively to Figs. 4 and 5 and showing a modification of such bushing.

Describing the parts by reference characters, A represents the upper part of a socket housing which is connected to the arm B. C denotes the ball which is employed with the socket, the said ball being carried by an arm D. The ball may be mounted in the socket housing in any desired manner as, for instance, in the manner shown in the application of David Benjamin filed October 12, 1928, Serial No. 312,043. In the form shown herein, the lower end of the socket housing is formed so as to provide a substantially frusto-conical seat tapering from its open end A' toward the closed rear end A². The socket comprises an upper housing section E and a lower housing section E', the housing sections when thus united providing a frusto-conical outer surface adapted to be seated within the frusto-conical surface of the housing A. The sections E and E' are so constructed that, when so assembled, the rear end of the housing thus formed will be closed, as indicated at G, except for an opening extending therethrough and registering with a like opening in the rear of the housing A for the passage of the connection H, through which lubricant may be forced into the joint.

Within the housing E, E' is mounted a packing consisting of two sections J and J', formed of rubber or other similar resilient shock-absorbing material providing, when assembled, a spherical inner face, which inner face receives lining members K and K', which are preferably of graphite bronze and which are adapted to fit about the surface of the ball C. The packing members J, J' are retained in place within the housing members E, E' by means of front flanges E² on said members, the said housing members providing an opening E³ for the reception of the adjacent reduced portion D' of the arm D.

The lining members K and K' are provided with flanges K² and K³, respectively, which are adapted to contact when the socket members are assembled and which extend between the proximate edges of the members J, J' and E, E'. The construction of the socket mounting for the ball forms in its details no part of my invention, the same being shown, described and claimed in the aforesaid application of David Benjamin.

In order to exclude dust from the ball-and-socket joint, I employ a dust cap L, made of deformable material, preferably semihard rubber. This cap has a cylindrical main body L extending from a neck L' provided at its center with a cylindrical aperture L² which is adapted to receive a bushing fitting about the reduced portion D' of the arm D. The dust cap is provided at the end opposite said central aperture with a flange L³ which is adapted to bear against the open end A' of the housing A, the said flange being formed at the end of the cylindrical main body portion L⁴ of said cap, from which cylindrical portion a frusto-conical portion L⁵ extends to the opposite end of the cap. At the outer end of the reduced portion D', the arm D is provided with lugs D² having shoulders adapted to engage the bushing inserted in the aperture L².

In applying the dust cap to its seat D', the cap is first softened, as by hot water, to an extent which will allow it to be stretched sufficiently to be slipped over the ball C, and over the bushing applied to the seat D'. For the bushing, I prefer to use the construction shown in Figs. 4 and 5, wherein the bushing is shown as made up of two symmetrical sections each comprising a semi-circular flange M adapted to bear against an outer seat L⁶ at the extreme of the neck of the dust cap and having one or more segmental cylindrical tongues M' projecting from said flange within the wall of the neck aperture L² and adapted to engage the reduced portion D' of the arm D. The internal diameter of the bushing is slightly greater than the diameter of the cylindrical shaft portion D' of the arm D. The cap is supported by the housing E, E', as shown in Fig. 1, with the result that a slight clearance is normally provided between the bushing tongues M' and the shaft D'. The wall of the neck aperture L² clamps the bushing sections together and this manner of mounting provides for an easy relatively rotary movement between the shaft and the dust cap, the friction being reduced to a minimum and being mainly due to the bearing of the flange M against the lugs D².

Dust caps of the type shown herein have been applied heretofore to the shaft portions D' of arms D with the wall of the aperture L² in engagement with such shaft portion and with a split spring washer inserted between the outer face of the neck portion of the cap and the lugs D². In operation this has resulted in wearing the wall L² of the neck aperture. Furthermore, due to the frictional engagement of the parts, the washer is frequently turned to an extent to bring the split thereof against one of the lugs D², with the result that further relative rotary movement of the washer and the shaft D' has resulted in splitting the washer and rendering it ineffective and useless. By the construction shown and described herein, the disadvantages referred to are overcome and the dust cap is not only effective for the purpose for which it is designed but is capable of standing up in use for a long time.

In Figs. 6 and 7, there is shown a modification of the bushing wherein each section has a flanged base M from which a semi-cylindrical sleeve M² projects, the bushing formed by assembling the parts providing a sleeve completely surrounding the part D' of the arm D and engaging the wall of the cylindrical opening L' throughout its circumferential extent.

Having thus described my invention, what I claim is:

1. A dust cap for a ball-and-socket joint having a housing provided with an opening, a mounting on said housing, and an arm extending through said opening and having a ball in said mounting, the said cap comprising a body of deformable material having one end provided with a bore and its other end adapted to enclose said opening, and a bushing in said bore adapted to surround the portion of said arm adjacent to said housing.

2. A dust cap for a ball-and-socket joint having a housing provided with an opening, a mounting on said housing, and an arm extending through said opening and having a ball in said mounting, the said cap comprising a body of deformable material having one end provided with a bore and its other end adapted to enclose said opening, and a bushing in said bore adapted to surround the portion of said arm adjacent to said housing, and provided with a radially extending flange at the outer end thereof adapted to engage the corresponding portion of the body of the cap.

3. A dust cap adapted for use in connection with a ball and socket joint comprised of a rod carrying a ball and a socket presenting a frusto-conical outer surface, said cap including a disk-like portion provided with a bore adapted to receive said rod and an annular flange adapted to receive said socket, said cap being made of resilient material, said cap including a bushing fitting within said bore.

4. A dust cap adapted for use in connection with a ball and socket joint comprised of a rod carrying a ball and a socket presenting a frusto-conical outer surface, said cap including a disk-like portion provided with a bore adapted to receive said rod and an annular flange adapted to receive said socket, said cap being made of resilient material, said cap including a bushing fitting within said bore, said bushing including a flange adapted to have a thrust engagement with a portion of said rod for protection of said resilient cap.

5. A dust cap adapted for use in connection with a ball and socket joint comprised of a rod carrying a ball and a socket presenting a frusto-conical outer surface, said cap including a disk-like portion provided with a bore adapted to receive said rod and an annular flange adapted to receive said socket, said cap being made of resilient material, said cap including a bushing fitting within said bore, said bushing including two semi-circular flanges and a plurality of tongues integral with each and extending perpendicularly thereto.

In testimony whereof, I hereunto affix my signature.

FRANK L. GRANT.